April 27, 1965 — E. CULP — 3,180,737
METHOD OF MAKING ANNULAR SAUSAGES
Filed Oct. 26, 1960

INVENTOR.
Ercel Culp
BY
Irons, Birch, Swindler & McKie
ATTORNEYS

United States Patent Office 3,180,737
Patented Apr. 27, 1965

3,180,737
METHOD OF MAKING ANNULAR SAUSAGES
Ercel Culp, Senath, Mo.
Filed Oct. 26, 1960, Ser. No. 65,114
4 Claims. (Cl. 99—109)

This invention relates to sausages and more particularly to annular sausages and a method for making annular sausages.

Sausages of annular configuration have a particular appeal, inter alia, because they can be made into sandwiches using circular hamburger buns rather than elongated finger rolls which are customarily employed to hold straight sausages. Such appeal particularly characterizes the form of sausage which is known as a frankfurter or hot dog. The annular sausage on a circular bun permits condiments such as mustard, onions, ketchup and the like to be placed in the open center of the annulus to minimize dripping of the condiments from the bun while the sandwich is being eaten.

Attempts have been made heretofore to produce annular sausages but the resulting products have not enjoyed any substantial consumer acceptance. In particular, it has been suggested to make a series of spaced transverse incisions extending most of the way through a frankfurter and then bending the frankfurter around its uncut side into an annulus with the cuts being separated on the radially outside of the annulus to provide a plurality of V-shaped notches extending into the frankfurter. The thus prepared frankfurter is roasted which purportedly causes the meat to expand into the notches and to hold the cooked product in circular form. Such a method and the resulting product are characterized by distinct disadvantages. In the first place the method does not lend itself to mass production techniques because of the various handling steps that are necessary, but is performed on a limited basis by cooks in hot dog stands or the like or the consumer himself. Moreover, the product is very unattractive because of the spaced notches and the bulging meat therein so as to preclude favorable consumer response. Further, the multiple transverse incisions provide a haven for bacteria and other contamination.

To overcome the disadvantages of the prior art it is an object of this invention to produce an annular sausage having a smooth unbroken skin-like surface extending continuously around the entire exterior of the annulus.

It is another object of this invention to produce an improved method for producing smooth and attractive annular sausages, which method readily lends itself to mass production techniques.

In general, the invention embraces a method of making circular sausages which comprises placing meat emulsion in a smooth continuous annular mold, cooking the meat emulsion in the mold to set the meat emulsion to produce an annular sausage having a smooth unbroken skin-like surface extending against the mold around the entire exterior of the sausage and separating the sausage from the mold. More particularly, it is contemplated to form a meat emulsion into a helix having a plurality of turns, cooking the meat emulsion and severing the helix at each turn to produce a plurality of annular sausages.

The invention further contemplates a sausage comprising a substantially complete annulus of cooked sausage meat having a smooth unbroken skin-like surface extending continuously around the entire exterior of the annulus.

The invention having been generally described, preferred specific embodiments of the method and product of the invention will now be set forth in detail with reference to the accompanying drawing in which.

Figure 1:
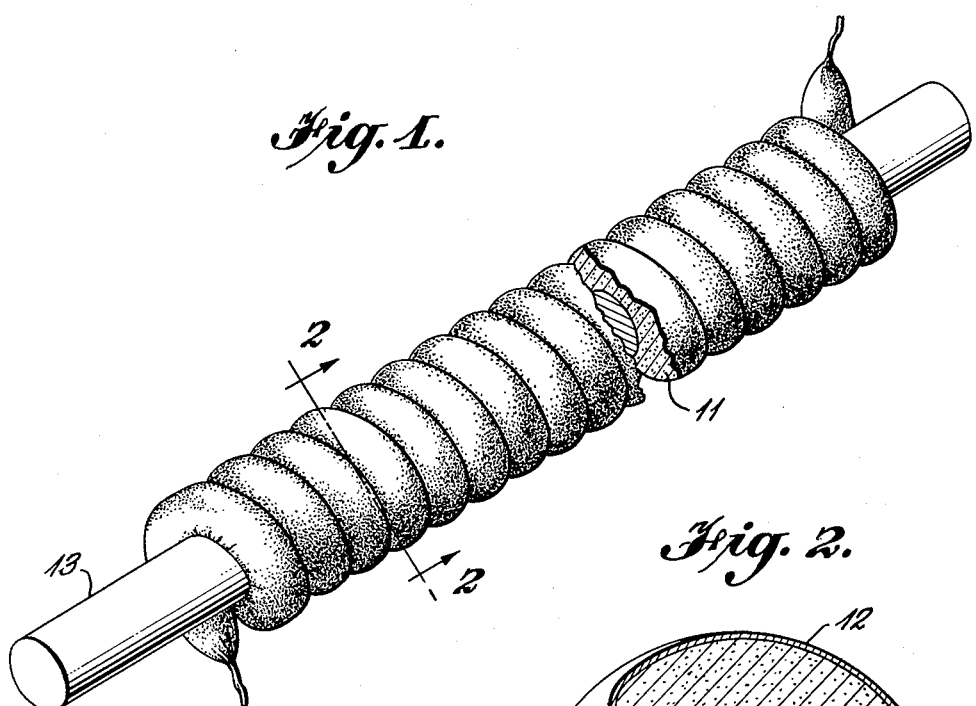
FIGURE 1 is a perspective view of sausage meat in an elongated tubular casing wound as a helix around a cylindrical mandrel.
Figure 2:
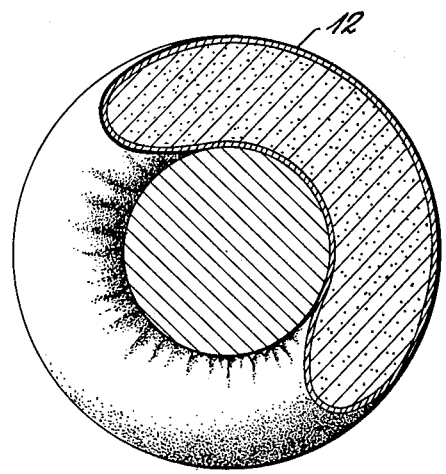
FIGURE 2 is a sectional view taken along the line 2—2 of FIGURE 1.

In accordance with the invention a comminuted meat emulsion is molded prior to cooking into an annular form. The meat emulsion may be of any of the wide variety of comminuted meat products employed in the manufacture of sausages of various types. The present invention finds particular utility and will be described in connection with that particular form of sausage known in the trade as a frankfurter or hot dog. Specifically, as shown in FIGURE 1, the meat emulsion 11 used to make frankfurters is stuffed into an elongated tubular casing 12 such as the conventional Visking casing. Because the emulsion has not yet been set by cooking the casing 12 containing the emulsion is quite flexible.

The casing containing the meat emulsion is then wrapped into a helix around a cylindrical mandrel 13 which may be made of wood or any other suitable material which does not affect the taste of the meat product. The mandrel with the helical casing wrapped thereon is then subjected to a temperature sufficiently high and for a sufficient time period to cook the meat. The cooking may be continued until the sausage is completely done so that it can be consumed without further cooking. Alternatively, the cooking may be discontinued after the emulsion has set to the degree that the sausage is capable of itself maintaining its annular configuration but with further cooking being necessary before the product is eaten.

Figure 3:
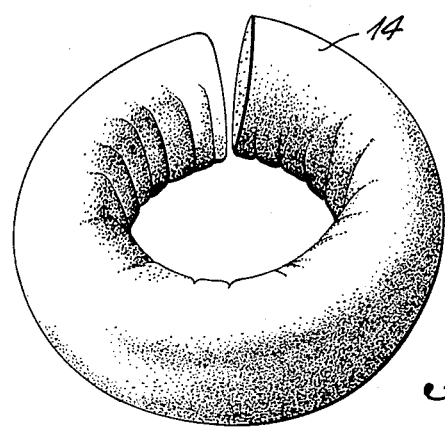
FIGURE 3 is a perspective view of a cooked annular sausage according to the invention.

After the meat is cooked to the desired extent, the casing is removed from around the meat in any desired manner. For example, the casing can be slit around the radially outer portion of each turn of the helix and stripped off of the meat without removing the sausage from the mandrel. After the casing has been removed, an incision is made longitudinally along the mandrel 13 to sever each turn of the helix. Preferably the cut is made along a line parallel to the axis of the mandrel 13. As a result of the cutting operation, each turn of the helix may be removed from the mandrel as an annular sausage 14 as shown in FIGURE 3.

According to the foregoing procedure, the resulting sausage is of the so-called skinless variety, the temporary casing in which the sausage has been cooked having been removed. By virtue of the molding of the sausage in the casing during the cooking operation, however, the exterior surface of the skinless product develops during the cooking operation a skin-like texture and appearance. The skin-like surface is tougher than the interior meat and provides a resistance to penetration generally termed a bite. Sausage which is not cooked in a casing or other mold is not characterized by such a skin-like surface covering. The product produced according to the present invention has a smooth unbroken skin-like surface extending around its entire exterior thus protecting the sausage against contamination by bacteria and the like and providing a smooth attractive appearance and favorable bite characteristics.

If desired, the helix may be cut at each turn to provide a plurality of individual annular sausages prior to the removal of the casing, after which the casing is removed from each such individual sausage. As a further alternative, a natural animal casing may be employed which is not removed but is left on the sausages which are sold in the casing to consumers.

Still further, the sausage may be linked in the casing prior to being wrapped on the cylindrical mandrel 13. The linking may be accomplished by any conventional technique. Desirably the spacing between links is equal to the circumference of one turn of the helix so that when the linked casing is wrapped on the mandrel the joints between each individual link are lined up longitudinally of the mandrel. After such a linked casing is wrapped around the mandrel and cooked as described hereinbefore, a cut may be made longitudinally of the mandrel through the joints between links so that each link is severed as a separate turn of the helix in annular configuration. Alternatively, the linked casing may be removed from the sausages without the cutting step to release the individual annular sausages.

While the invention has been described with respect to preferred specific embodiments of the method and product, it will be understood that various modifications may be made by persons skilled in the art without departing from the scope of the invention as defined by the appended claims.

I claim:

1. A method of making annular sausages which comprises forming a flexible tubular sausage casing containing meat emulsion into a helix having a plurality of turns, maintaining said casing in a helix while cooking said meat emulsion to set it in annular configuration, and severing said helix at each turn to produce a plurality of annular sausages.

2. The method as recited in claim 1 wherein said casing is removed after cooking to produce skinless sausages.

3. A method of making annular sausages which comprises winding a flexible tubular sausage casing containing meat emulsion around a cylindrical mandrel to form a helix having a plurality of turns, cooking said meat emulsion to set it in annular configuration, and severing one side of said helix longitudinally of said mandrel to separate each turn of said helix thereby producing a plurality of circular sausages.

4. The method as recited in claim 3 wherein said casing is removed after cooking to produce skinless sausages.

References Cited by the Examiner

UNITED STATES PATENTS

| | | | |
|---|---|---|---|
| 243,036 | 6/81 | Hall | 69—21 |
| 1,706,225 | 3/29 | Goldberg et al. | 99—109 |
| 1,825,528 | 9/31 | Knudsen | 99—109 |
| 1,983,681 | 12/34 | Seaver | 99—109 |
| 2,246,236 | 6/41 | Becker | 99—176 |
| 2,766,125 | 10/56 | Peschke | 99—109 X |

A. LOUIS MONACELL, *Primary Examiner.*

ABRAHAM H. WINKELSTEIN, HYMAN LORD,
*Examiners.*